April 3, 1962 W. H. SCHECHTER ET AL 3,028,221
CONTINUOUS PROCESS FOR THE PRODUCTION OF BORANES
Filed Dec. 15, 1958
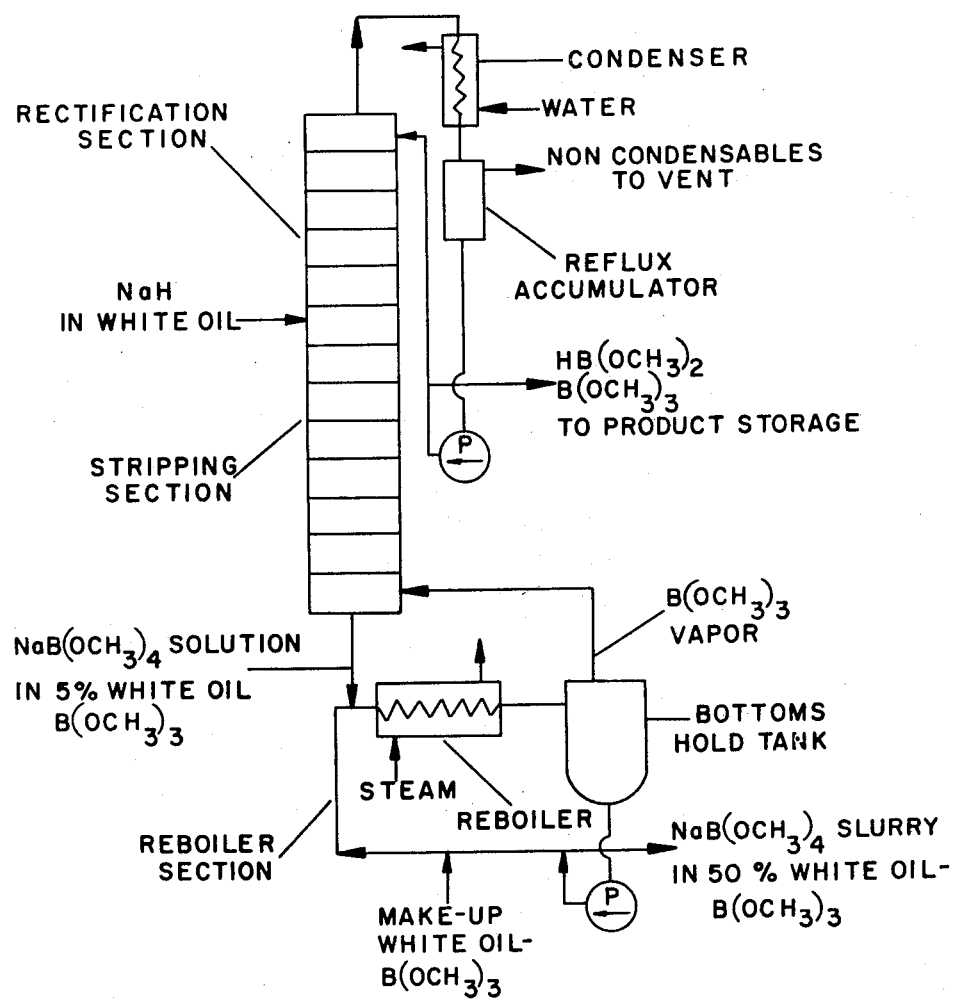
WILLIAM H. SCHECHTER
DURLAND K. SHUMWAY  *INVENTOR.*
ALVIN MURCHISON
BY
Donald L. Rose

CONTINUOUS PROCESS FOR THE PRODUCTION OF BORANES

William H. Schechter, Bradfordwoods, Durland K. Shumway, Valencia, and Alvin Murchison, Evans City, Pa., assignors to Callery Chemical Company, Pittsburgh, Pa., a corporation of Pennsylvania
Filed Dec. 15, 1958, Ser. No. 780,626
12 Claims. (Cl. 23—204)

This invention relates to a process for the preparation of dimethoxyborane and more particularly to its preparation by the continuous reaction of sodium hydride and methyl borate.

It has been discovered by Carpenter, Bush and Schechter, Ser. No. 441,636, filed July 6, 1954, of common ownership with this application, that dimethoxyborane can be recovered by contacting sodium hydride and liquid methyl borate using at least 2 moles of methyl borate for each mole of sodium hydride and heating the mixture to produce a vapor product containing dimethoxyborane. The dimethoxyborane is formed according to the overall equation

$$NaH + 2B(OCH_3)_3 = HB(OCH_3)_2 + NaB(OCH_3)_4$$

The rate at which the dimethoxyborane was produced from these reactions was relatively slow as the reaction required from several hours to several days to proceed to completion. Continuous processing is economically unfeasible when such relatively long reaction times are required, and hence the method suffers from all the disadvantages inherent in batch chemical processing, e.g. the necessity of loading and unloading for each reaction and the varying rate of production due to changing conditions and concentrations during the course of batch reactions. In addition, the by-product sodium tetramethoxyborate is a voluminous solid product and mechanical handling of this material in continuous processing equipment is difficult.

It is an object of this invention to provide a simple economical method whereby dimethoxyborane may be continuously produced in good yields.

This invention is predicated on the discovery that the reaction of sodium hydride and methyl borate to produce dimethoxyborane can be made to go rapidly to completion by keeping the amount of dimethoxyborane in the liquid or condensed reaction phase at less than about 1 part for every 100 parts of methyl borate, and on the discovery that the by-product sodium tetra-methoxyborate is solvated and the solvate is soluble in the condensed reaction phase if a massive excess of methyl borate is maintained in the condensed reaction phase.

It is believed that the reaction of sodium hydride and methyl borate proceeds rapidly, probably through some intermediate to produce dimethoxyborane according to

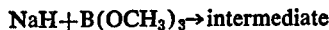
$$NaH + B(OCH_3)_3 \rightarrow \text{intermediate}$$
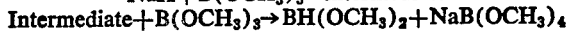
$$\text{Intermediate} + B(OCH_3)_3 \rightarrow BH(OCH_3)_2 + NaB(OCH_3)_4$$

The dimethoxyborane formed, however, will react with the sodium tetramethoxyborate product, sodium hydride reactant, and probably the intermediates, to form sodium borohydride. For example,

$$NaB(OCH_3)_4 + 4BH(OCH_3)_2 = NaBH_4 + 4B(OCH_3)_3$$

The sodium borohydride formed by this back reaction will react with methyl borate to form dimethoxyborane only at a very slow rate. Unless the back reaction producing sodium borohydride is prevented the reaction must be continued for a long period of time to obtain a substantial yield of dimethoxyborane; conversely, if continuous reactors with feasibly short resident times are used and the conditions are such that the sodium borohydride is formed by the back reaction, only very low yields of dimethoxyborane are obtained.

According to this invention, the back reaction consuming dimethoxyborane and producing sodium borohydride is essentially eliminated by maintaining a low dimethoxyborane concentration in the reaction phase. The desired low concentration of dimethoxyborane is maintained by rapidly removing it from the condensed reaction phase by vaporization. The vaporized product, since it is in equilibrium with a liquid phase containing a high proportion of methyl borate and a small amount of dimethoxyborane, contains a high proportion of methyl borate and a small amount of dimethoxyborane.

For example, the vapor in equilibrium with a condensed reaction phase containing 1 part dimethoxyborane to 100 parts of methyl borate contains about 2.2% dimethoxyborane and 97.8% methyl borate; a condensed reaction phase containing 0.5 part dimethoxyborane to 100 parts of methyl borate is in equilibrium with a vapor containing about 1.3% dimethoxyborane. The liquid-vapor equilibrium is affected slightly by the presence of an inert third fluid, such as mineral oil, since there is some change in the relative volatilities of dimethoxyborane and methyl borate. In addition to the methyl borate consumed by chemical reaction, there must be added a large amount of methyl borate to make up for that removed from the reaction phase in the vaporized product. This methyl borate may be added as a liquid, and the heat required for vaporization may be added through the walls of the container or through heating coils or other conventional methods. The necessary heat and methyl borate is preferably added simultaneously by feeding methyl borate vapor. If there is not sufficient methyl borate supplied the dimethoxyborane concentration will increase, diverting a certain portion into the back reaction, and the remainder will be recovered as a vapor product from the reaction at a higher dimethoxyborane concentration. It is apparent that the higher the rate of dimethoxyborane formation the more rapidly methyl borate must be supplied to maintain the desired methoxyborane concentration. The rate of dimethoxyborane formation increases with decreasing particle size of the sodium hydride reactant. It is generally preferred to use sodium hydride with a nominal diameter of 20 to 50 microns; when more finely divided sodium hydride is used it is mechanically difficult to supply methyl borate at a fast enough rate, and when coarser sodium hydride is used the reaction is slowed and a longer reaction time is required.

The figure schematically illustrates a preferred method of preparing dimethoxyborane according to this invention and will hereinafter be described in detail.

It is preferred to introduce sodium hydride to the reaction as a slurry in a saturated hydrocarbon since there are a number of difficulties encountered in using a dry sodium hydride feed that can be overcome only by the use of special complicated feeding systems. For example, dry sodium hydride is a fire hazard since it is extremely reactive with atmospheric moisture producing hydrogen and sufficient heat to ignite the hydrogen. Furthermore, when excess sodium hydride and methyl borate vapor are contacted, conditions that would exist for example at the discharge opening of a dry sodium hydride feeder, they react to form a solid of much greater volume than the original sodium hydride. This solid is adherent and compacts easily, resulting in jamming of the feeding equipment. These difficulties are not encountered when a feed of sodium hydride in hydrocarbon is used because of the protective action of the hydrocarbon film. Any saturated hydrocarbon may be used as the suspending liquid, although it is preferred to use a hydrocarbon of low volatility to facilitate the separation of the volatile reaction product from the suspending liquid. Commercial white oils or mineral oils are particularly desirable. It is generally preferred to use a feed containing at least 40% white oil, and preferably more than 60% white oil, as such slurries are more easily pumped and handled than thicker slurries.

The remarkable effect of the dimethoxyborane concentration in the condensed reaction phase on the yield of dimethoxyborane is illustrated by the following single stage continuous reactions. The reactor consisted of a jacketed autoclave 3 inches in diameter and 6 inches long equipped with an agitator, a liquid overflow tube that maintained a 3 inch liquid depth in the reactor and suitable flush, feed, and discharge lines. The reactor was flushed with nitrogen to remove air and moisture, and the entire reaction was run in the absence of air and moisture to prevent loss of hydrogen and possible explosion. The reactor was filled with methyl borate and heat was supplied through the walls of the autoclave to give the desired rate of methyl borate vaporization. Liquid make-up methyl borate was fed into the reactor. A slurry containing 3% sodium hydride in white oil was continuously fed to the reactor. The vaporized material was continuously removed overhead, condensed, collected and analyzed, and the slurry of condensed reaction phase was continuously removed through the liquid overflow tube. In one reaction the boil up rate was adjusted so that 5.3 moles of methyl borate were vaporized for each mole of sodium hydride fed and the nominal residence time of the sodium hydride was 20 minutes (nominal residence time=volume rate of slurry feed/liquid volume of reactor). The overhead product from the reactor contained 2.95% dimethoxyborane corresponding to a liquid reaction phase containing about 1.3% dimethoxyborane, and the yield was only 17.8%. In a second reaction, the boil up ratio was 58.5 and the residence time was 11.9 minutes; the overhead product contained only 1.3% dimethoxyborane and yield was 71.4%.

Since it is necessary to maintain very low dimethoxyborane concentrations in the condensed reaction phase, the concentration of the dimethoxyborane in the vapor product will also be very low. The heat required to provide the necessary methyl borate boil up may be conserved to concentrate the product by combining the reactor with a rectification column. For example, several reactions were performed using a two stage reactor, similar to the single stage reactor described above, in combination with a rectification column. The reactor consisted of two stirred autoclaves equipped with suitable inlet and outlet connections. The sodium hydride-white oil slurry was fed into the first reactor, and the condensed reaction phase overflowed from the first reactor into the second reactor, and overflowed from the second reactor. The methyl borate was fed into the second reactor and the vapors from the second reactor passed into the first reactor and the final vapor product was discharged from the first reactor. The vapor product stream from the first reactor was passed into the bottom of a rectification column consisting of 2 inch pipe packed with ¼ inch beryl saddles, which was equipped with a condenser, reflux accumulator and divider, and a product receiver. The liquid reflux from the rectification column was returned to the first stage of the two stage reactor. In this manner the reaction section can be run at a low dimethoxyborane concentration but the product recovered from the combined reactor and rectification column can be concentrated to any degree desired. It is normally preferred to recover a product containing no more than 15 to 20% dimethoxyborane if it is desired to store the product since at higher concentrations the dimethoxyborane tends to disproportionate to diborane and methyl borate. It must be noted that the reflux stream from the rectification column to the reactor will contain some dimethoxyborane, and this will result in a change in equilibrium concentration of dimethoxyborane in the reactor. It is essential that this return stream does not contain too high a proportion of dimethoxyborane, so that the equilibrium dimethoxyborane concentration in the reactor section is not increased to too high a value. Thus for example, in a reaction in which the methyl borate boil up ratio to sodium hydride fed was 160 lbs. per lb., with a nominal residence time of thirty minutes, when the reflux return from the rectification column contained 0.8% dimethoxyborane the yield of dimethoxyborane recovered was 85%. However, under the same reaction conditions, when the reflux return contained 2.8% dimethoxyborane the yield was only 56%. The composition of this return stream can be predicted from normal distillation calculations, and adjusted by changing the number of plates, take-off rate and reflux ratio in the rectification section.

The hydrocarbon fed to the reactor as a sodium hydride suspending medium acts as an inert diluent in the reaction. It is preferred to keep the concentration of this hydrocarbon in the condensed reaction phase below about 25%, i.e., less than about 25 parts hydrocarbon to 100 parts of methyl borate, since at high concentrations the reaction is slowed considerably because of the diluent effect.

A preferred method for continuously producing dimethoxyborane according to this invention is illustrated in FIGURE 1. The sodium hydride reactant is fed to a central plate of a plate column. The stripping section, the section below the feed plate, functions as a continuous countercurrent reactor. The rectification section, the section above the feed plate, concentrates the dilute dimethoxyborane product recovered from the stripping section. The methyl borate vapor fed to the column is supplied from the reboiler section. The operation and function of these sections are hereinafter described in detail.

*Feed plate and stripping section.*—A slurry of the reactant sodium hydride in white oil is fed to the central plate of the dimethoxyborane reactor-column, where it contacts the refluxing liquid from the rectification section and the vapors from the stripping section. On the feed plate and in the stripping section there occurs simultaneously (1) the reaction of sodium hydride with methyl borate, (2) the formation and dissolution of sodium tetramethoxyborane-methyl borate solvate, and (3) the formation and distillative separation of dimethoxyborane from the condensed reaction phase. The condensed reaction phase contains the hydrocarbon suspending liquid, refluxing methyl borate, as well as the reactants and reaction products. The concentration of dimethoxyborane in the condensed reaction phase is higher on the feed plate than on any other plate in the stripping section due to the distillation occurring in the stripping section. In order to obtain essentially quantitative yields of dimethoxyborane, by repressing the back reaction to sodium borohydride, it is necessary to keep the concentration of dimethoxyborane in the feed plate at less than 1% and preferably less than 0.5%. The vapor in equilibrium with such a condensed reaction phase contains from about 1.3 to 2.2% dimethoxyborane. This requires that from about 45 to 75 pounds of methyl borate must be vaporized or boiled up, through the stripping section for each pound of dimethoxyborane produced, which is equivalent to a boil up ratio of about 150 to 250 pounds of methyl borate for each pound of sodium hydride fed.

The reaction produces by product tacky solids that will compact and build up a solid crust that eventually plugs the vapor and liquid passages between plates in the stripping section. In order to permit continuous reactions for long periods without the periodic cleaning of the stripping section, it is necessary to have a condensed reaction phase of sufficient volume to dissolve all the by-product sodium tetramethoxyborate-methyl borate solvate. The sodium tetramethoxyborate-methyl borate solvate is metastable, spontaneously decomposing into insoluble sodium tetramethoxyborate and methyl borate.

This is evidenced by the fact that sodium tetramethoxyborate is insoluble in methyl borate, and does not form the solvate, and that the solubility of the solvate decreases with time. The solvate is formed only when the sodium tetramethoxyborate is formed by reaction in the presence of excess methyl borate. For example, the solubility of freshly prepared sodium tetramethoxyborate-methyl borate solvate was measured at 68° C. in a solution containing 39% white oil and 61% methyl borate at various time intervals. After thirty minutes the solubility express in moles of sodium tetramethoxyborate dissolved per 1000 grams of methyl borate (total, including that required to form the solvate) was .14, after ninety minutes was .02 and after twenty-four hours was .017. The rate of destruction of the solvate increases with increasing temperature. It is apparent therefore that if extended residence times are used in the stripping section that a higher volume of liquid must be present to assure the solubility of the by-product sodium tetramethoxyborane-methyl borate solvate. The solvate solubility is also dependent upon the concentration of white oil in the condensed reaction phase and the temperature of the condensed reaction phase. To illustrate, the solubility of the solvate (moles salt/1000 g. methyl borate) after thirty minutes contact at 68° C. was .015 in a solution containing 53.6 wt. percent white oil; .046 in a solution containing 47.3 wt. percent white oil; .138 in a solution containing 39 wt. percent white oil; and .175 in a solution containing 34 wt. percent white oil. The solubility in a solution containing 25 wt. percent white oil after two and one-half hours contact was .018 at 24° C., and .184 at 68° C. It is preferred to keep the concentration of white oil in the reaction phase at less than about 25% to facilitate dissolution of the sodium tetramethoxyborate, as well as to minimize the effect of the diluent on the reaction rate.

*Rectification section.*—The vapor product from the stripping section contains only about 1 to 2 percent dimethoxyborane in methyl borate. When a non-volatile white oil is used as a suspending liquid for the sodium hydride fed to the column there is essentially no suspending liquid vaporized from the stripping section. The rectification section serves to concentrate the product and is designed according to conventional distillation methods. If it is desired to recover and store dimethoxyborane for further reaction or use, the product is concentrated to about 20% dimethoxyborane in methyl borate. Dimethoxyborane disproportionates to diborane and methyl borate according to $6BH(OCH_3)_2 \rightarrow B_2H_6 + 4B(OCH_3)_3$. This disproportionation reaction is best carried out in a distillation column in which dimethoxyborane is simultaneously concentrated and separated from the disproportionation product methyl borate, as is disclosed in Huff and Schechter, Ser. No. 510,527, filled May 23, 1955, and now abandoned, of common ownership with this application. Thus, if it is preferred to produce diborane directly from the reactor column, the rectification section may be run at total liquid reflux, so that it functions as a disproportionation reactor, and the non-condensible diborane formed is vented from the condenser.

*Reboiler section.*—In a conventional reboiler the liquid effluent from the bottom of the column is passed through a reboiler, which vaporizes a portion of the material which is returned to the bottom plate of the column, and the material not vaporized is discharged as a liquid bottoms product. The liquid effluent from the stripping section in this column reactor is a solution of sodium tetramethoxyborane-methyl borate solvate. When the liquid is passed through a conventional reboiler the increased temperature and increased concentration of the white oil cause both a decrease in solubility of the solvate and breaking of the solvate to form insoluble sodium tetramethoxyborate. When this occurs, the solids tend to cake out on the boiler tubes, resulting in a lower heat transfer coefficient through the boiler tubes and eventual plugging of the boiler tubes. Under these conditions it is necessary either to have parallel boilers that may be alternatingly used in cleaning and operating cycles or to stop operation of the column periodically to clean the boiler. The fouling of the boiler tubes can be substantially eliminated by precipitating the sodium tetramethoxyborate from the column effluent prior to its passage through the boiler. We have found that this can be accomplished by maintaining a high concentration of white oil in a circulating reboiler system, and by feeding the liquid column effluent into the circulating system upstream of the boiler. The reboiler section as illustrated in FIGURE 1, consists essentially of a bottoms hold tank, a circulation pump, and the reboiler. The white oil concentration in the bottoms hold tank is maintained at a high level, preferably at about 50%, and the white oil concentration in the entire reboiler section is higher than that which would be in equilibrium with the bottom plate of the column. The liquid effluent from the column may be fed to the reboiler section either in the bottoms hold tank, or to the lines between the bottoms hold tank and the reboiler. The dissolved solids in the liquid column effluent are immediately precipitated when the effluent is mixed with the reboiler liquid containing a high proportion of white oil. The resultant slurry is then passed through the reboiler where the required methyl borate is vaporized. The bottoms hold tank also serves as a vapor disengager to separate the vaporized methyl borate. The make-up methyl borate and white oil, if required, is fed to the reboiler section.

The following reaction illustrates the operation of the preferred column-reactor. The column-reactor was a bubble cap column of conventional design, two feet in diameter, about 50 feet high, and with 30 plates spaced at 15 inches. Each plate contained one 4 inch downcomer, 17 caps, and operated with a 1 inch liquid seal. A slurry containing 25.4% sodium hydride in white oil was feed to the sixth plate (from the top) at a rate of 21.1 pounds of sodium hydride per hour. The vapor rate in the column was 4000 pounds per hour, giving a boil up ratio of 190 pounds of methyl borate for each pound of sodium hydride fed. The reflux ratio, the pounds of reflux returned to the top of the column per pound of product removed, was 8.7. The column effluent was a solution of sodium tetramethoxyborate solvate in 95% methyl borate–5% mineral oil. The slurry bottoms product from the boiler section contained 26.3% solids in a liquid containing 48% white oil and 52% methyl borate. The overhead condensed product contained 16.04% dimethoxyborane in methyl borate and contained 96.4% of the hydridic hydrogen fed. A small amount of disproportionation occurred in the column, and 1.42% of the hydridic hydrogen fed was recovered as diborane. The total yield of dimethoxyborane based on hydridic hydrogen was 96.4% and the total yield of dimethoxyborane and diborane was 97.82%. The 2.18% loss was distributed between losses to hydrogen gas, caused by reaction with traces of hydrolytic impurities in the system, and to unreacted material containing hydridic hydrogen in the bottoms product. Samples of the liquid on each plate in the stripping section were taken and analyzed for total active hydrogen content. This showed that the reaction was essentially complete at only 8 plates below the feed plate, which is equivalent to a nominal residence time of approximately 5 minutes.

According to the provisions of the patent statutes, we have explained the principle and mode of practicing my invention, have described what we consider to be its best embodiments. However, we wish to have it understood that, within the scope of the appended claims, the invention may be practiced otherwise than as specifically described.

We claim:
1. A method of preparing dimethoxyborane that comprises the steps of contacting a slurry of sodium hydride and a saturated hydrocarbon with excess methyl borate to form a reaction mixture, maintaining the concentration of dimethoxyborane in said reaction mixture at less than about 1 part dimethoxyborane to 100 parts of methyl borate by continuously vaporizing dimethoxyborane from the reaction mixture, and recovering the dimethoxyborane.

2. A method of preparing dimethoxyborane that comprises the steps of contacting a slurry of sodium hydride and a saturated hydrocarbon with excess methyl borate to form a reaction mixture, said reaction mixture containing less than about 25 parts hydrocarbon to 100 parts of methyl borate, maintaining the concentration of dimethoxyborane in said reaction mixture at less than 1 part dimethoxyborane to 100 parts methyl borate by continuously vaporizing dimethoxyborane from the reaction mixture, and recovering the dimethoxyborane.

3. A method of preparing dimethoxyborane that comprises the steps of continuously contacting a slurry of sodium hydride and a saturated hydrocarbon with liquid methyl borate to form a reaction mixture, maintaining the concentration of dimethoxyborane in said reaction mixture at less than about 1 part dimethoxyborane to 100 parts of methyl borate by countercurrently contacting said reaction mixture with methyl borate vapor, using at least about 150 pounds of methyl borate vapor for each pound of sodium hydride, and recovering the resultant vapor product containing dimethoxyborane.

4. A method of preparing dimethoxyborane that comprises the steps of continuously contacting a slurry of sodium hydride and a saturated hydrocarbon with liquid methyl borate to form a reaction mixture, countercurrently contacting said reaction mixture with methyl borate vapor, using at least about 150 pounds of methyl borate vapor for each pound of sodium hydride, distilling the resultant vapor product, recovering the overhead product containing dimethoxyborane, and returning the bottoms product to supply liquid methyl borate to the reaction mixture.

5. A method of preparing dimethoxyborane that comprises the steps of continuously contacting a slurry of sodium hydride and a saturated hydrocarbon with liquid methyl borate to form a reaction mixture, said reaction mixture containing less than about 25 parts of hydrocarbon for each 100 parts of methyl borate, countercurrently contacting said reaction mixture with methyl borate vapor, using at least about 150 pounds of methyl borate vapor for each pound of sodium hydride, distilling the resultant vapor product, recovering the overhead product containing dimethoxyborane, and returning the bottoms product to supply liquid methyl borate to the reaction mixture.

6. A method of preparing dimethoxyborane that comprises continuously contacting a slurry of sodium hydride and a saturated hydrocarbon with methyl borate in the central portion of a distillation column operating at partial reflux, continuously removing a bottoms product consisting essentially of sodium tetramethoxyborate, methyl borate, and hydrocarbon, and continuously recovering an overhead product containing dimethoxyborane.

7. A method of preparing dimethoxyborane that comprises continuously contacting a slurry of sodium hydride and a saturated hydrocarbon with methyl borate in the central portion of a distillation column operating at partial reflux, boiling up through the column at least about 150 pounds of methyl borate for each pound of sodium hydride fed, the column reflux forming a reaction mixture with the sodium hydride slurry, said reaction mixture containing sufficient methyl borate to dissolve the resulting sodium tetramethoxyborate solvate, continuously removing a bottoms product consisting essentially of sodium tetramethoxyborate, methyl borate and hydrocarbon, and continuously recovering an overhead product containing dimethoxyborane.

8. A method according to claim 7 in which the methyl borate vapor is supplied from a still reboiler section comprising a recirculation loop and a boiler, maintaining the boiler temperature such that the boiler liquid effluent contains about 50% hydrocarbon, feeding the column reflux to the circulation loop upstream of said boiler, and returning the methyl borate vapor boiler effluent to the bottom of the distillation column.

9. A method of preparing dimethoxyborane that comprises continuously contacting a slurry of sodium hydride and a saturated hydrocarbon with methyl borate in the central portion of a distillation column operating at partial reflux, boiling up through the column at least about 150 pounds of methyl borate for each pound of sodium hydride fed, the column reflux forming a reaction mixture with the sodium hydride slurry, said reaction mixture containing less than about 25 parts of hydrocarbon to 100 parts of methyl borate, said reaction mixture containing sufficient methyl borate to dissolve the resulting sodium tetramethoxyborate solvate, continuously removing a bottoms product consisting essentially of sodium tetramethoxyborate, methyl borate and hydrocarbon, and continuously recovering an overhead product containing dimethoxyborane.

10. A method according to claim 9 in which the hydrocarbon is a white oil.

11. A method of preparing diborane that comprises continuously contacting a slurry of sodium hydride and a saturated hydrocarbon in the central portion of a distillation column operating at total reflux, boiling up through the column at least 150 pounds of methyl borate for each pound of sodium hydride, the column reflux forming a reaction mixture with the sodium hydride slurry, said reaction phase containing sufficient methyl borate to dissolve the resulting sodium tetramethoxyborate solvate, continuously removing a bottoms product consisting essentially of sodium tetramethoxyborate, methyl borate, and mineral oil, and continuously discharging overhead the resultant non-condensable diborane.

12. A method of preparing at least one borane from the group consisting of dimethoxyborane and diborane that comprises continuously contacting a slurry of sodium hydride and a saturated hydrocarbon with at least 150 pounds of methyl borate for each pound of sodium hydride in the central portion of a distillation column, continuously removing a bottoms product consisting essentially of sodium tetramethoxyborate, methyl borate, and hydrocarbon, and continuously recovering an overhead product containing the borane.

References Cited in the file of this patent

UNITED STATES PATENTS

| | | |
|---|---|---|
| 2,461,661 | Schlesinger et al. | Feb. 15, 1949 |
| 2,534,533 | Schlesinger et al. | Dec. 19, 1950 |